O. REDMOND.

Assignor by mesne assignments to H. H. DOUBLEDAY.

PACKING FOR OIL-WELLS.

No. 7,494. Reissued Feb. 6, 1877.

Witnesses.

Henry Orth

H. H. Bass.

Inventor.

for Owen Redmond.

per H. H. Doubleday.

atty.

UNITED STATES PATENT OFFICE.

OWEN REDMOND, OF ROCHESTER, NEW YORK, ASSIGNOR TO RUFUS F. OSGOOD, OF SAME PLACE; SAID OSGOOD ASSIGNOR TO H. H. DOUBLEDAY, OF WASHINGTON, DISTRICT OF COLUMBIA.

IMPROVEMENT IN PACKING FOR OIL-WELLS.

Specification forming part of Letters Patent No. 59,319, dated October 30, 1866; reissue No. 7,494, dated February 6, 1877; application filed December 20, 1876.

DIVISION A.

*To all whom it may concern:*

Be it known that OWEN REDMOND, of Rochester, in the county of Monroe and State of New York, invented certain new and useful Improvements in Packer for Oil-Wells; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 2:
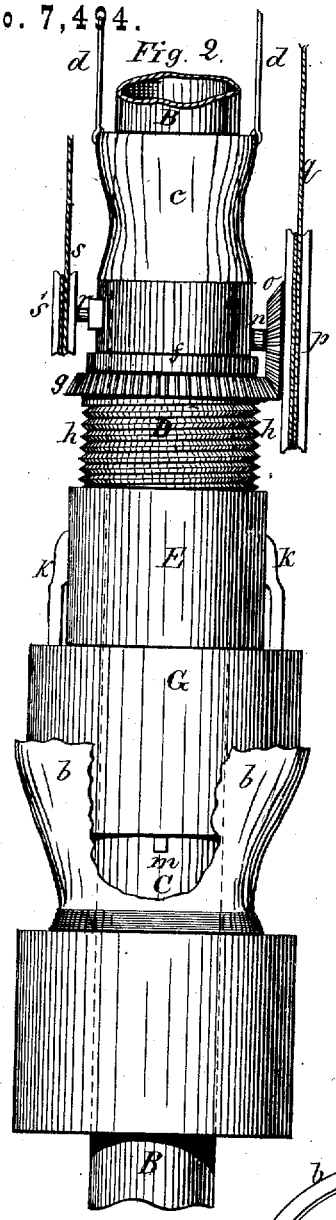
Figure 1:
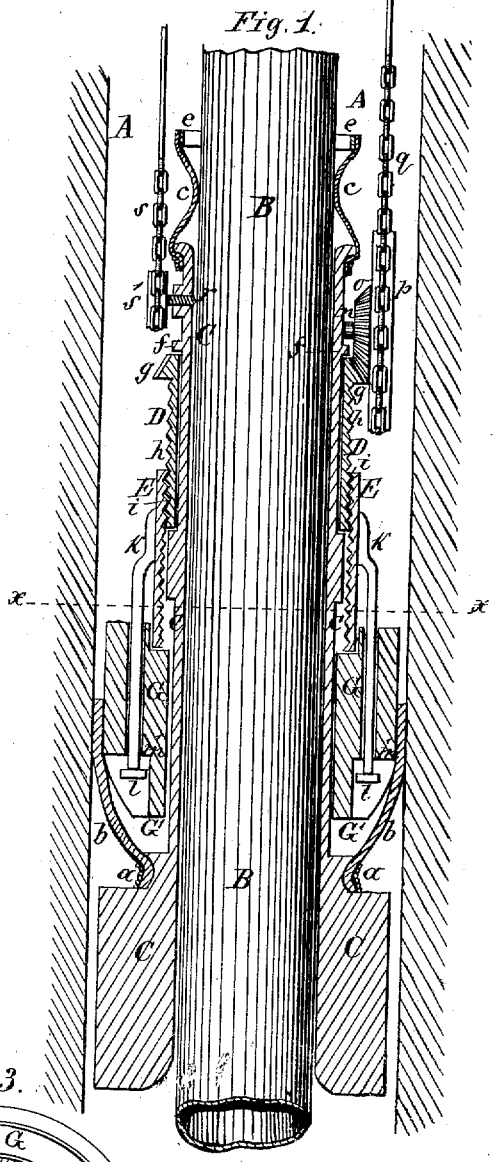
Figure 3:
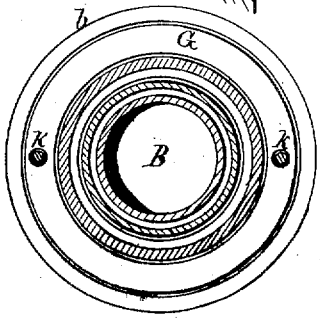

Figure 1 is a vertical section taken on line *x x* of Fig. 3. Fig. 2 is an elevation; and Fig. 3 is a transverse or horizontal section taken on the line *y y*, Fig. 1.

Like letters of reference indicate corresponding parts in all the figures.

Prior to the date of this invention it was customary to pack the pumping-tube or discharging-tube in an oil-well by means of what is generally known as a "seed-bag"—that is, a bag secured firmly to the tube at the desired point and filled with flaxseed, which seed, when the tube and bag were in proper position, became wetted by the water in the well, and, swelling, pressed the bag against the wall of the well, or against both the discharging-tube and the wall of the well, thus completely filling a short section of the annular space between the tube and the wall of the well. One of the objections incident to the use of such seed-bags is the great difficulty in removing them or the tubing from the well after the seed has swelled, owing to the fact that no provision has been made for reducing or removing the pressure upon the tube or well which is produced by this swelling of the seed.

The object of one part of this invention is to remedy the above-recited defect in the working or operating of the seed-bag; and to this end the first part of the invention consists in an oil-well packer, a flexible or elastic material, and a mechanical device controlled by the operator, whereby such flexible or elastic packing material may be forced against the wall of the well, and whereby also this mechanical pressure may be released or relieved in order that the withdrawal of the packer shall be facilitated.

Another objection to the employment of the seed-bag is the fact that it cannot be moved up or down in the well, after it has been rendered tight by the swelling of the seed, without removing the tubing or casing to which it is applied.

In order to overcome this defect the second part of this invention was made, which consists in so constructing the packer that it may be elevated or lowered within the well by means other than the tubing or casing which it packs, such means being operated from the top of the well.

The third part of the invention relates to the combination of a flexible packing material with a cylinder or tube which is so short that it does not reach to the top of the well, and a mechanical device which presses the elastic material against the wall of the well, in such manner that the packer will be held firmly in place independently of any devices or parts which reach to the top of the well, and in such manner that the pumping-tube may be withdrawn without disturbing or removing the packer.

The invention further consists in combining, with the discharging-tube, a flexible packing in the form of a cup, which receives the column of water, and has its sides expanded against the wall of the well thereby.

The invention further consists in certain details of construction, as will be fully explained.

As represented in the drawings, A is the shaft or bore of the well, and B the elevating or oil-discharging tube.

The packing may be of any construction that will secure the following effects, to wit: first, it must be capable of being compressed or packed against the wall of the well, and of being released therefrom at the will of the operator; and, secondly, it must slide up and down on the central elevating-tube, so as to be fixed in any desired place without removing the tubing, and pack both the shaft and tube. I prefer that shown in the drawings, which is of the following construction:

Around the elevating-tube B fits a cylinder or tube, C, of suitable length, sliding up and down over the oil-tube, and preferably made of considerable weight.

To the lower portion is attached at *a*, in any suitable manner, a cup-shaped disk or ring, *b*, of buckskin, leather, or other suitable material, which is placed with its mouth or open end or side upward, for the purpose of packing outward against the wall of the well when the proper mechanical devices are applied to operate it, as will be described.

To the top of cylinder C is applied a flexible collar or sleeve, *c*, which packs against the oil-tube B, as clearly represented.

The weight of the packing-device is made sufficient to carry it (the sleeve *c*) downward over the oil-tube easily, and, in rising, it will usually come up without difficulty; or, if desired, small cords or wires *d d*, Fig. 2, may be employed for that purpose. I prefer to insert a small ring, *e*, in the upper end to keep it open.

It will be seen that if the disk or rim *b* and the collar *c* are packed tightly, no water can pass through the packer to the oil below. Around the cylinder C, and near its upper end, and between shoulders *f f*, is situated a collar or sleeve, D, turning loosely, and having at its top a beveled cog-ring, *g*, and provided upon its sides with a screw-thread, *h*. Outside the lower part of this collar is another sleeve or collar, E, which serves as a nut, its inner surface being also cut into a screw-thread, *i*, that engages with the thread *h*. This latter collar E can move up and down on cylinder C, but is not allowed to rotate thereon by reason of arms *k k*, the upper ends of which are rigidly attached to it, (cylinder C,) the lower ends of the arms passing down through sockets in a circular wedge, G, and have heads *l l* on their lower ends.

The annular wedge G is simply a hollow head, whose lower edge is beveled, as shown at G′, Fig. 1, and which also slides freely up and down on cylinder C, but is prevented from rotating thereon by means of a feather or spline, *m*, on the cylinder C, fitting in a groove or seat in the wedge G.

Thus it will be perceived that if the collar D be turned in the proper direction, the collar E will be forced down as a nut, and consequently, also, the annular wedge G, which expands the packing-rim *b* out against the sides of the well.

By turning the collar E in an opposite direction, the wedge G will be raised and the packing released from the wall of the well, the heads *l l* of the arms *k k* engaging with the shoulders *m′ m′* of the wedge for that purpose.

From this description of the operation of the portion of the device thus far described, it will be seen that as the annulus G approaches that part of the cylinder C represented at *a*, which supports the flexible or elastic packing, said packing is expanded laterally and pressed against the wall of the well, and also that when the annulus G recedes from the packing-ring support, such packing cup or ring is released, and may be readily removed from the well.

On a bearing, *n*, near the top of the cylinder C, is situated a bevel-pinion, *o*, which gears with the cog-ring *g*. This pinion *o* is rigidly attached to a grooved wheel or sheave, *p*, which receives motion by either a wire or cord, *q*, wound once or twice around its periphery, (see Fig. 2,) or by means of a chain engaging with spurs upon its rim, (see Fig. 1,) or in some similar manner. In either case the wire is double, and extends to the top of the well.

By this means, it will be seen, the wedge G may be tightened or loosened at any time by simply operating the wire or chain, provided the cylinder C be fastened securely to the oil-tube.

I secure this cylinder to the oil-tube in any desired position by means of a set-screw, *r*, whose point, passing through the cylinder, strikes against the oil-tube, and, when screwed up by means of the wire *s* passing around sheave *s″* or the set-screw, draws the cylinder so tightly against the tube that it cannot slip. The wire *s* also extends to the top of the well.

In addition to operating the parts *p* and *r*, the wires or chains may serve to raise or lower the packing device in the well.

The arrangement that I have above described is but one simple form of an adjustable packing device for an oil-well. Many others may be used that will involve the same essential principle. After the wedge G has pressed the disk *b* against the wall, the set-screw *r* may be backed out and the discharging-tube withdrawn from the well without disturbing the packer.

What is claimed as the invention of OWEN REDMOND is—

1. The combination, in an oil-well packer, of a flexible packing material, and a pressing device arranged outside of the discharging-tube, which presses the packing material against the wall of the well, substantially as set forth.

2. An oil-well packer which is supported independently of the discharging-tube or casing of the well by being expanded against the wall of the well, substantially as set forth.

3. The combination, in an oil-well packer, of a flexible ring or disk surrounding a tube or cylinder, and an annular wedge-shaped device which presses or expands the flexible packing-ring against the wall of the well, substantially as set forth.

4. The combination, in an oil-well packer, of a flexible packing material which surrounds a tube, and a device operated by means of a screw-thread upon the outside of the tube, to press the flexible packing against the wall of the well, substantially as set forth.

5. In combination with the discharging-tube of an oil-well, flexible packing material pressing against both the tube and the wall of the well, substantially as set forth.

6. In an oil-well packer, a packing-cylinder through which the discharging-tube can move freely, an elastic or flexible packing material surrounding such packing-cylinder, and a mechanical device for expanding the packing material against the wall of the well, substantially as set forth.

7. A packing for an artesian well, made adjustable vertically within the well, substantially as set forth.

8. In combination with a packing which is movable vertically within an artesian well, a clamping device adapted to secure the packer to the discharging-tube, substantially as set forth.

In testimony that I claim the foregoing I have hereunto set my hand this 11th day of December, 1876.

R. F. OSGOOD.

Witnesses:
EDWIN SCOTT,
JACOB SPAHER.